(12) United States Patent
Yang et al.

(10) Patent No.: US 9,609,634 B2
(45) Date of Patent: Mar. 28, 2017

(54) METHOD FOR TRANSMITTING CONTROL INFORMATION AND DEVICE THEREFOR

(71) Applicant: LG ELECTRONICS INC., Seoul (KR)

(72) Inventors: Suckchel Yang, Seoul (KR); Yunjung Yi, Seoul (KR); Bonghoe Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/770,785

(22) PCT Filed: Mar. 13, 2014

(86) PCT No.: PCT/KR2014/002119
§ 371 (c)(1),
(2) Date: Aug. 26, 2015

(87) PCT Pub. No.: WO2014/142577
PCT Pub. Date: Sep. 18, 2014

(65) Prior Publication Data
US 2016/0029371 A1 Jan. 28, 2016

Related U.S. Application Data

(60) Provisional application No. 61/780,856, filed on Mar. 13, 2013, provisional application No. 61/808,615, (Continued)

(51) Int. Cl.
*H04W 4/00* (2009.01)
*H04W 72/04* (2009.01)
(Continued)

(52) U.S. Cl.
CPC ......... *H04W 72/0413* (2013.01); *H04J 11/00* (2013.01); *H04L 1/1812* (2013.01);
(Continued)

(58) Field of Classification Search
CPC ........... H04W 72/0413; H04W 74/006; H04W 72/0446; H04W 72/1268; H04L 5/0048;
(Continued)

(56) References Cited

U.S. PATENT DOCUMENTS

2011/0128942 A1* 6/2011 Kim ..................... H04B 7/0639
370/336
2011/0310726 A1 12/2011 Di et al.
(Continued)

FOREIGN PATENT DOCUMENTS

EP 2306667 4/2011
KR 10-2009-0028401 3/2009
(Continued)

OTHER PUBLICATIONS

3rd Generation Partnership Project (3GPP), "Technical Specification Group Radio Access Network; Evolved Universal Terrestrial Radio Access (E-UTRA); Physical Channels and Modulation (Release 11)," 3GPP TS 36.211 V11.1.0, Dec. 2012, 190 pages.
(Continued)

*Primary Examiner* — Afshawn Towfighi
(74) *Attorney, Agent, or Firm* — Lee, Hong, Degerman, Kang & Waimey PC

(57) ABSTRACT

The present invention relates to a wireless communication system. Particularly, the present invention relates to a method for transmitting an uplink signal in a wireless communication system and a device therefor, the method comprising the step of transmitting the uplink signal through a plurality of SC-FDMA symbols within a subframe, wherein: the uplink signal includes RI and HARQ-ACK information; the plurality of SC-FDMA symbols include an SC-FDMA symbol #n for an RS, an SC-FDMA symbol of a first set for the RI, and an SC-FDMA symbol of a second set for the HARQ-ACK; n is an integer of 0 or more; the
(Continued)

SC-FDMA symbol of the first set includes SC-FDMA symbols #n−2, #n+2, #n+5 and #n+6; and the SC-FDMA symbol of the second set includes SC-FDMA symbols #n−1, #n+1, #n+3 and #n+4.

12 Claims, 11 Drawing Sheets

Related U.S. Application Data filed on Apr. 4, 2013, provisional application No. 61/811,128, filed on Apr. 12, 2013, provisional application No. 61/817,350, filed on Apr. 30, 2013.

(51) Int. Cl.
*H04J 11/00* (2006.01)
*H04L 5/00* (2006.01)
*H04L 1/18* (2006.01)
*H04W 72/12* (2009.01)
*H04W 74/00* (2009.01)

(52) U.S. Cl.
CPC .......... *H04L 5/0048* (2013.01); *H04L 5/0055* (2013.01); *H04L 5/0094* (2013.01); *H04W 72/0446* (2013.01); *H04W 72/1268* (2013.01); *H04W 74/006* (2013.01)

(58) Field of Classification Search
CPC ... H04L 1/1812; H04L 5/0094; H04L 5/0055; H04J 11/00
See application file for complete search history.

(56) References Cited

U.S. PATENT DOCUMENTS

| | | | |
|---|---|---|---|
| 2012/0057551 A1* | 3/2012 | Kim | H04L 5/0007 370/329 |
| 2012/0170524 A1 | 7/2012 | Ren et al. | |
| 2012/0236816 A1 | 9/2012 | Park et al. | |
| 2013/0034028 A1 | 2/2013 | Chen et al. | |
| 2013/0039284 A1 | 2/2013 | Marinier et al. | |
| 2013/0058307 A1 | 3/2013 | Kim et al. | |

FOREIGN PATENT DOCUMENTS

| | | |
|---|---|---|
| KR | 10-2010-0017051 | 2/2010 |
| KR | 10-2012-0025994 | 3/2012 |
| KR | 10-2012-0062820 | 6/2012 |
| WO | 2012/050372 | 4/2012 |
| WO | 2012070672 | 5/2012 |

OTHER PUBLICATIONS

PCT International Application No. PCT/KR2014/002119, Written Opinion of the International Searching Authority dated Jun. 20, 2014, 11 pages.
European Patent Office Application Serial No. 14764367.0, Search Report dated Sep. 9, 2016, 9 pages.
3rd Generation Partnership Project; Technical Specification Group Radio Access Network; Evolved Universal Terrestrial Radio Access (E-UTRA); Physical layer procedures (Release 11), 3GPP TS 36.213 V11.1.0, Feb. 2012, 160 pages.
3rd Generation Partnership Project; Technical Specification Group Radio Access Network; Evolved Universal Terrestrial Radio Access (E-UTRA); Physical Channels and Modulation (Release 11), 3GPP TS 36.211 V11.1.0, Feb. 2012, 108 pages.
China Telecom, "Discussion on spectral efficiency improvement for small cell enhancements" R1-130354, 3GPP TSG RAN WG1 Meeting #72, Feb. 2013, 6 pages.
U.S. Appl. No. 14/771,159, Office Action dated Dec. 1, 2016, 16 pages.
European Patent Office Application Serial No. 14763552.8, Search Report dated Dec. 22, 2016, 8 pages.

* cited by examiner

* PUSCH may be transmitted with/without UL-SCH data.
* If the PUSCH allocation is made as a part of random access procedure, no UCI transmission is transmitted in subframe #n.

METHOD FOR TRANSMITTING CONTROL INFORMATION AND DEVICE THEREFOR

CROSS-REFERENCE TO RELATED APPLICATIONS

This application is the National Stage filing under 35 U.S.C. 371 of International Application No. PCT/KR2014/002119, filed on Mar. 13, 2014, which claims the benefit of U.S. Provisional Application No. 61/780,856, filed on Mar. 13, 2013, 61/808,615, filed on Apr. 4, 2013, 61/811,128, filed on Apr. 12, 2013 and 61/817,350, filed on Apr. 30, 2013, the contents of which are all hereby incorporated by reference herein in their entirety.

TECHNICAL FIELD

The present invention relates to a wireless communication system and, more specifically, to a method for transmitting control information and an apparatus for the same.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method and device for efficiently transmitting control information in a wireless communication system.

The technical problems solved by the present invention are not limited to the above technical problems and other technical problems which are not described herein will become apparent to those skilled in the art from the following description.

Technical Solution

The object of the present invention can be achieved by providing a method of transmitting an uplink signal at a user equipment (UE) in a wireless communication system including transmitting the uplink signal via a plurality of single carrier frequency division multiple access (SC-FDMA) symbols in a subframe, wherein the uplink signal includes rank information (RI) and hybrid automatic repeat request acknowledgement (HARQ-ACK) information, wherein the plurality of SC-FDMA symbols includes SC-FDMA symbol #n for a reference signal (RS), a first set of SC-FDMA symbols for the RI and a second set of SC-FDMA symbols for HARQ-ACK and n denotes an integer of 0 or more, and wherein the first set of SC-FDMA symbols includes SC-FDMA symbols #n−2, #n+2, #n+5 and #n+6 and the second set of SC-FDMA symbols includes SC-FDMA symbols #n−1, #n+1, #n+3 and #n+4.

In another aspect of the present invention, provided herein is a user equipment (UE) configured to transmit an uplink signal in a wireless communication system including a radio frequency (RF) unit and a processor, wherein the processor is configured to transmit the uplink signal via a plurality of single carrier frequency division multiple access (SC-FDMA) symbols in a subframe, wherein the uplink signal includes rank information (RI) and hybrid automatic repeat request acknowledgement (HARQ-ACK) information, wherein the plurality of SC-FDMA symbols includes SC-FDMA symbol #n for a reference signal (RS), a first set of SC-FDMA symbols for the RI and a second set of SC-FDMA symbols for the HARQ-ACK and n denotes an integer of 0 or more, and wherein the first set of SC-FDMA symbols includes SC-FDMA symbols #n−2, #n+2, #n+5 and #n+6 and the second set of SC-FDMA symbols includes SC-FDMA symbols #n−1, #n+1, #n+3 and #n+4.

When a normal cyclic prefix (CP) is configured, the subframe may include 14 SC-FDMA symbols and SC-FDMA symbol #n is SC-FDMA symbol #3.

When an extended cyclic prefix (CP) is configured, the subframe may include 12 SC-FDMA symbols and SC-FDMA symbol #n is SC-FDMA symbol #2.

The RI may be mapped to SC-FDMA symbols #n−2 and #n+2 and then may be mapped to SC-FDMA symbols #n+5 and #n+6.

The HARQ-ACK may be mapped to SC-FDMA symbols #n−1 and #n+1 and then may be mapped to SC-FDMA symbols #n+3 and #n+4.

The uplink signal may include a physical uplink shared channel (PUSCH) signal.

Advantageous Effects

According to embodiments of the present invention, it is possible to efficiently transmit control information in a wireless communication system.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Figure 1:
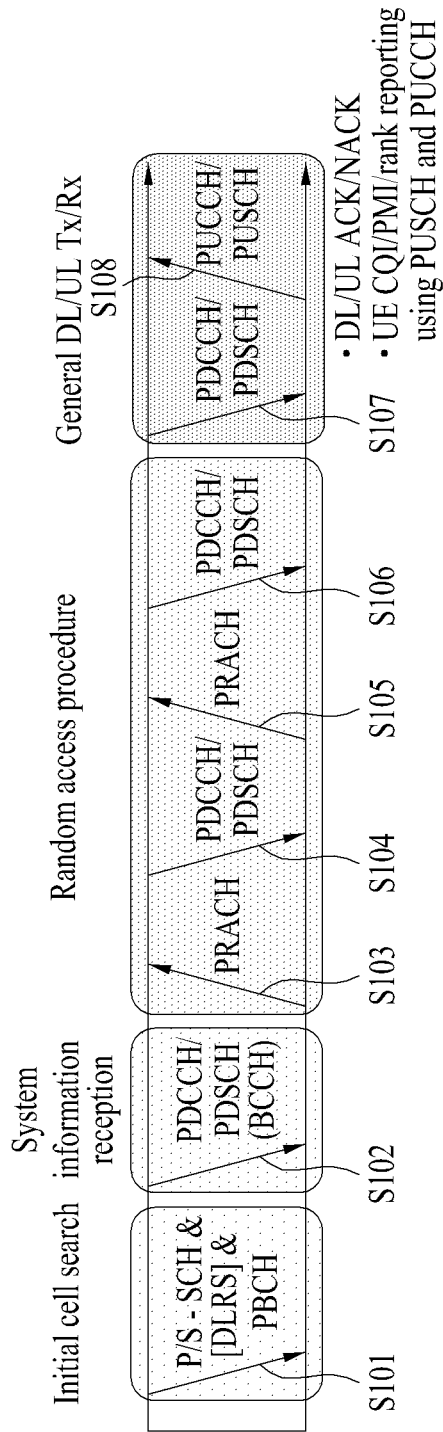
FIG. 1 illustrates physical channels used in a 3GPP LTE system as an exemplary wireless communication system and a signal transmission method using the same.

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE.

While the following description is given, centering on 3GPP LTE/LTE-A for clarity, this is purely exemplary and thus should not be construed as limiting the present invention. It should be noted that specific terms disclosed in the present invention are proposed for convenience of description and better understanding of the present invention, and the use of these specific terms may be changed to other formats within the technical scope or spirit of the present invention.

The terms used in the specification are described.

Demodulation reference signal (DMRS) symbol: Indicates an SC-FDMA symbol, on which a DMRS for PUSCH demodulation is transmitted, in a subframe, to which a PUSCH is allocated. This is also referred to as a DMRS SC-FDMA symbol. In this specification, the SC-FDMA symbol may be replaced with an OFDMA symbol.

Non-DMRS symbol: Indicates an SC-FDMA symbol, on which a DMRS for PUSCH demodulation is not transmitted, in a subframe, to which a PUSCH is allocated. This is also referred to as a non-DMRS SC-FDMA symbol. The non-DMRS symbol includes an uplink control information (UCI) symbol and a sounding reference signal (SRS) symbol, for example. The UCI symbol indicates an SC-FDMA symbol, on which UCI (e.g., ACK/NACK and/or RI) is transmitted, in a subframe, to which a PUSCH is allocated. The SRS symbol indicates an SC-FDMA symbol reserved for SRS transmission in a cell-specific SRS subframe (e.g., a last SC-FDMA symbol of a subframe).

Legacy DMRS: Indicates a legacy structure in which a DMRS for PUSCH transmission is transmitted in LTE/LTE-A. For convenience, the legacy DMRS indicates a structure in which two DMRSs are transmitted per subframe ((that is, one DMRS is transmitted per slot) (see FIG. 8).

DMRS variance: Indicates that, as compared to the legacy DMRS, fewer time resources (e.g., SC-FDMA symbols) or frequency resources (e.g., subcarriers) are used for PUSCH demodulation (hereinafter, reduced DMRS) or more time resources (e.g., SC-FDMA symbols) or frequency resources (e.g., subcarriers) are used for PUSCH demodulation (hereinafter, increased DMRS).

RB pair: An RB pair indicates two neighboring RBs in the time domain of a subframe unless otherwise stated. That is, the PR pair includes an RB of a first RB and an RB of a second slot and the two RBs have the same RB index. The RB pair may be indicated by an RB index.

In a wireless communication system, a UE receives information from a BS on downlink (DL) and transmits information to the BS on uplink (UL). Information transmitted/received between the UE and BS includes data and various types of control information, and various physical channels are present according to type/purpose of information transmitted/received between the UE and BS.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement(ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
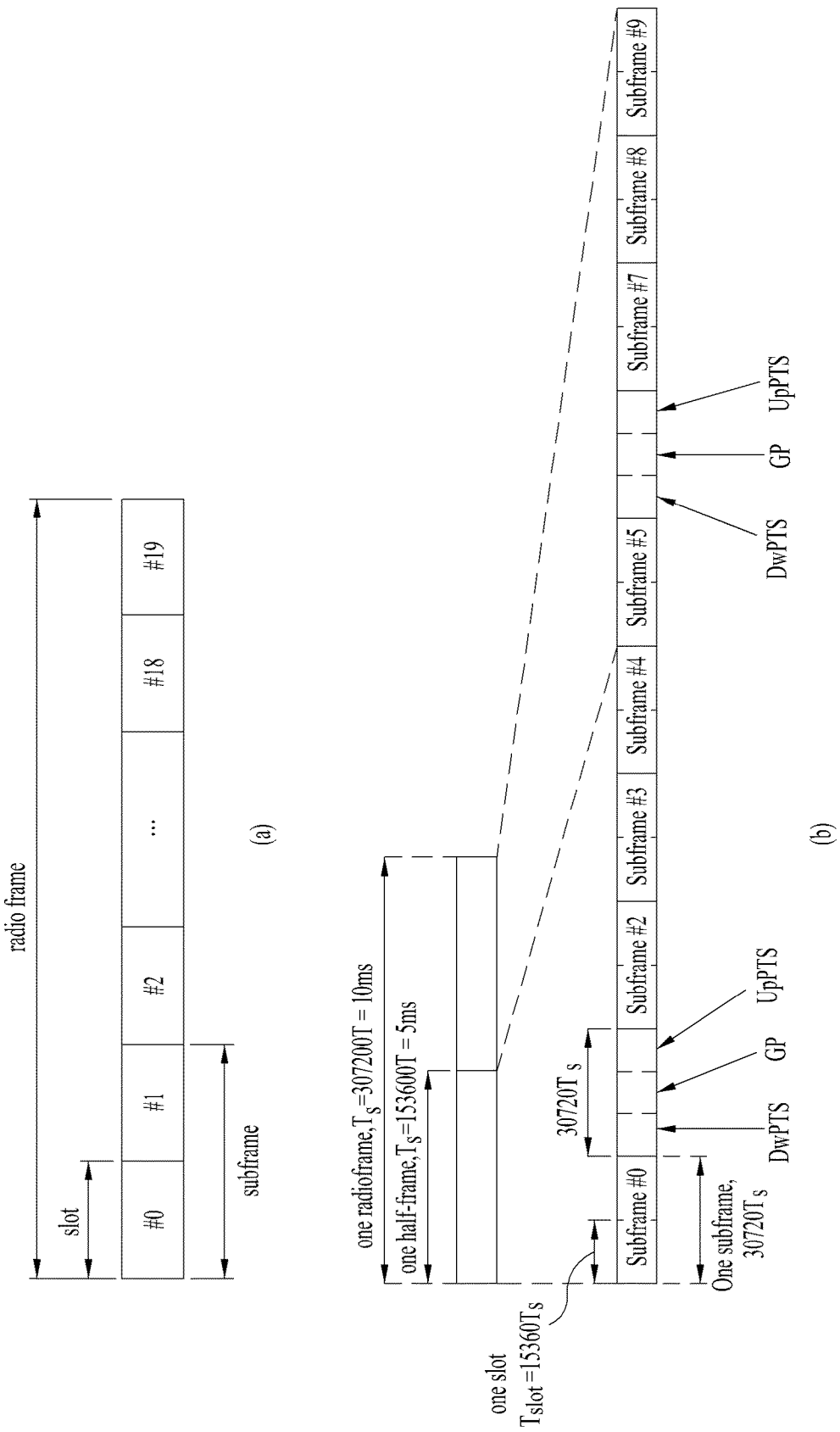
FIG. 2 illustrates a radio frame structure.

FIG. 2 illustrates a radio frame structure. In a cellular OFDM wireless packet communication system, uplink/downlink data packet transmission is performed on a sub-frame-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 2(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC-FDMA symbol or symbol period. An RB as a resource allocation unit may include a plurality of consecutive subcarriers in one slot.

The number of OFDM symbols included in one slot may depend on Cyclic Prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 2(b) illustrates a type-2 radio frame structure. The type-2 radio frame includes 2 half frames. Each half frame includes 5 subframes, a Downlink Pilot Time Slot (DwPTS), a Guard Period (GP), and an Uplink Pilot Time Slot (UpPTS), and one subframe consists of 2 slots. The DwPTS is used for initial cell search, synchronization or channel estimation. The UpPTS is used for channel estimation in a BS and UL transmission synchronization acquisition in a UE. The GP eliminates UL interference caused by multi-path delay of a DL signal between a UL and a DL.

The radio frame structure is merely exemplary and the number of subframes included in the radio frame, the number of slots included in a subframe, and the number of symbols included in a slot can be vary.

Figure 3:
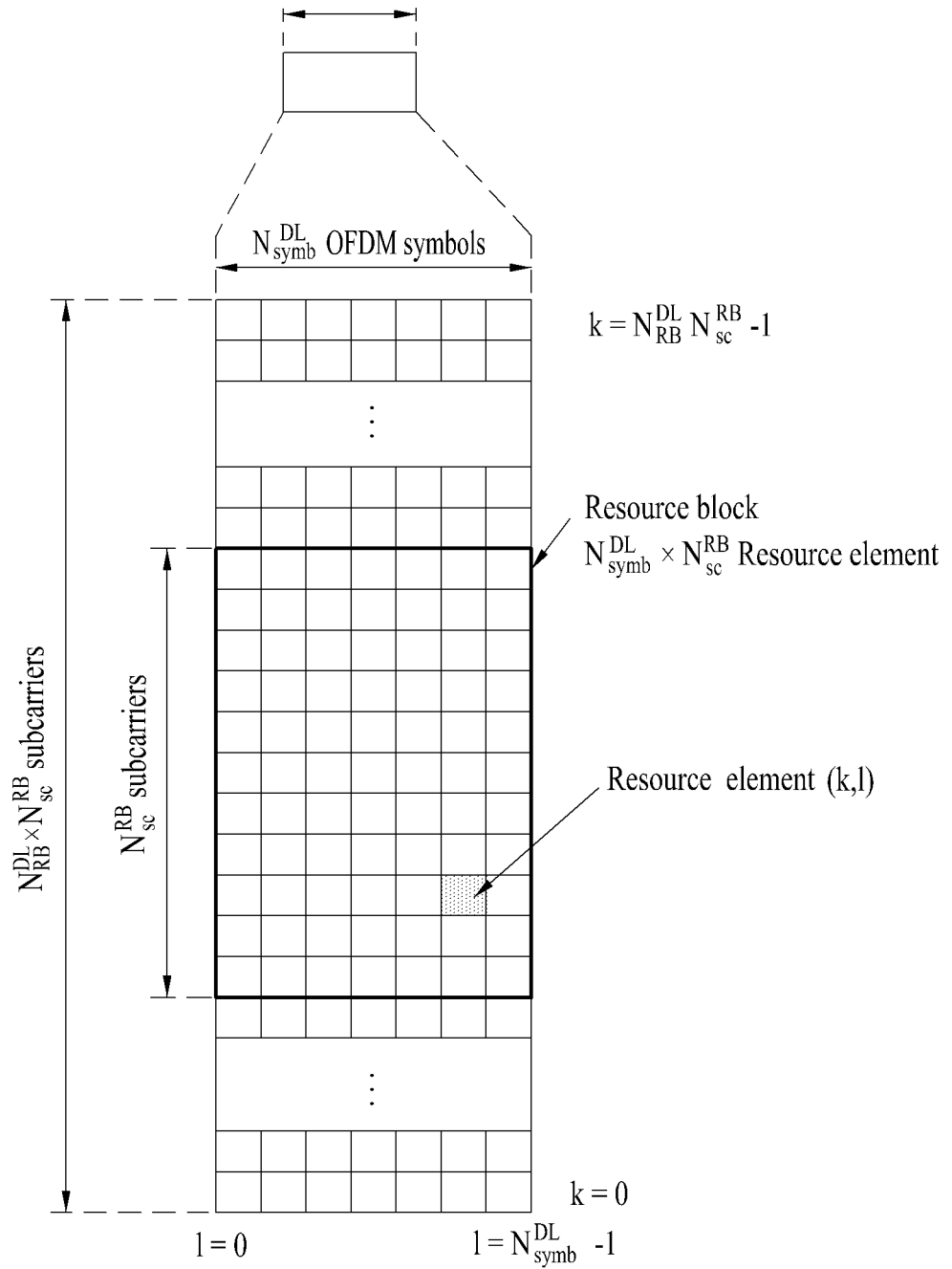
FIG. 3 illustrates a resource grid of a downlink slot.

FIG. 3 illustrates a resource grid of a downlink slot.

Referring to FIG. 3, a downlink slot includes a plurality of OFDM symbols in the time domain. One downlink slot may include $N^{DL}_{symb}$ (e.g., 7(6)) OFDM symbols and a resource block may include 12 subcarriers in the frequency domain. Each element of a resource grid is referred to as a resource element (RE). One RB includes 12×7(6) REs. The number $N^{DL}_{RB}$ of RBs included in the downlink slot depends on downlink transmission band. k denotes a subcarrier index (k=0, 1, . . . ) and l denotes an OFDM symbol index ((l=0, 1, . . . , $N^{DL}_{symb}$−1). The structure of the uplink slot is equal to that of the downlink slot, except that the OFDM symbol is replaced with the SC-FDM symbol, $N^{DL}_{symb}$ is replaced with $N^{UL}_{symb}$, and $N^{DL}_{RB}$ is replaced with $N^{UL}_{RB}$.

Figure 4:
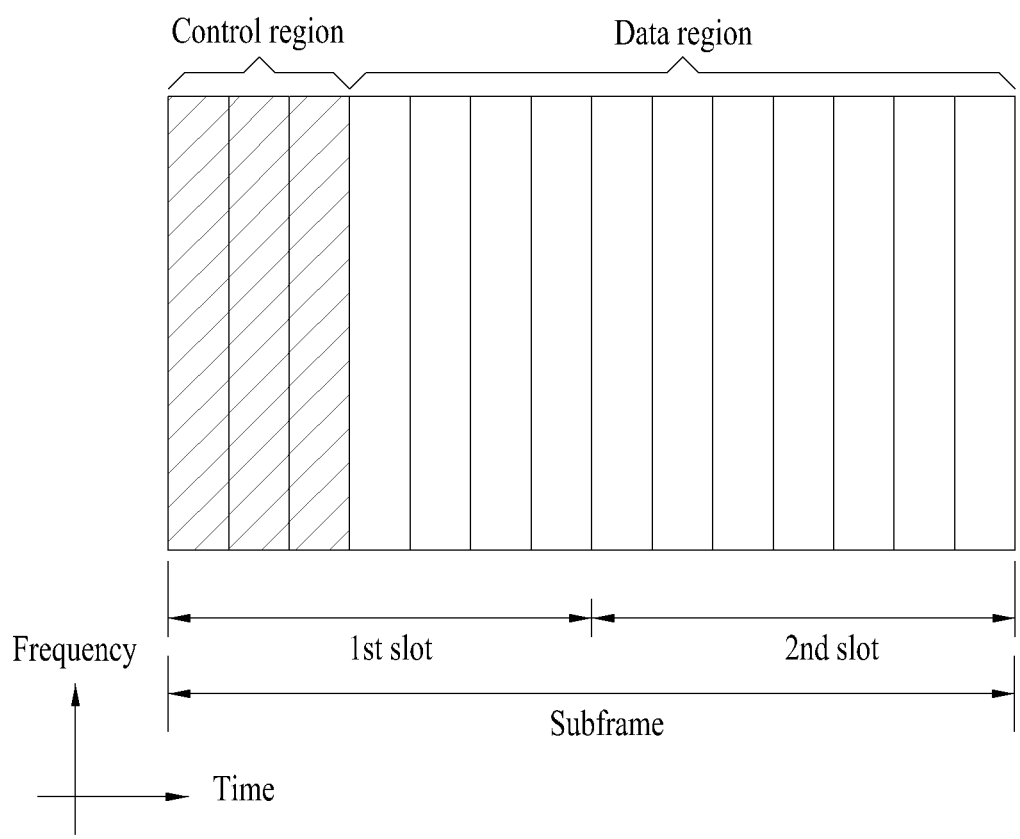
FIG. 4 illustrates a downlink subframe structure.

FIG. 4 illustrates a downlink subframe structure.

Referring to FIG. 4, a maximum of three (four) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal.

Control information transmitted through the PDCCH is referred to as downlink control information (DCI). Formats 0, 3, 3A and 4 for uplink and formats 1, 1A, 1B, 1C, 1D, 2, 2A, 2B and 2C for downlink are defined as DCI formats. The DCI formats selectively include information such as hopping flag, RB allocation, MCS (Modulation Coding Scheme), RV (Redundancy Version), NDI (New Data Indicator), TPC (Transmit Power Control), cyclic shift DM RS (Demodulation Reference Signal), CQI (Channel Quality Information) request, HARQ process number, TPMI (Transmitted Precoding Matrix Indicator), PMI (Precoding Matrix Indicator) confirmation according as necessary.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

In LTE/LTE-A, a CCE set, in which a PDCCH may be located for each UE, was defined. A CCE set, in which a UE may find a PDCCH thereof, may be referred to as a PDCCH search space (SS) or an SS. An individual resource in which a PDCCH may be transmitted in the SS is referred to as a PDCCH candidate. One PDCCH candidate corresponds to 1, 2, 4 or 8 CCEs according to CCE aggregation level. An eNB transmits a real PDCCH (DCI) via an arbitrary PDCCH candidate in the SS and a UE monitors the SS in order to find the PDCCH (DCI). More specifically, the UE attempts blind decoding (BD) with respect to PDCCH candidates in the SS. A UE-specific search space (USS) and a common search space (CSS) are defined. The USS is individually configured for each UE and the CSS is commonly configured for all UEs within a cell.

Figure 5:
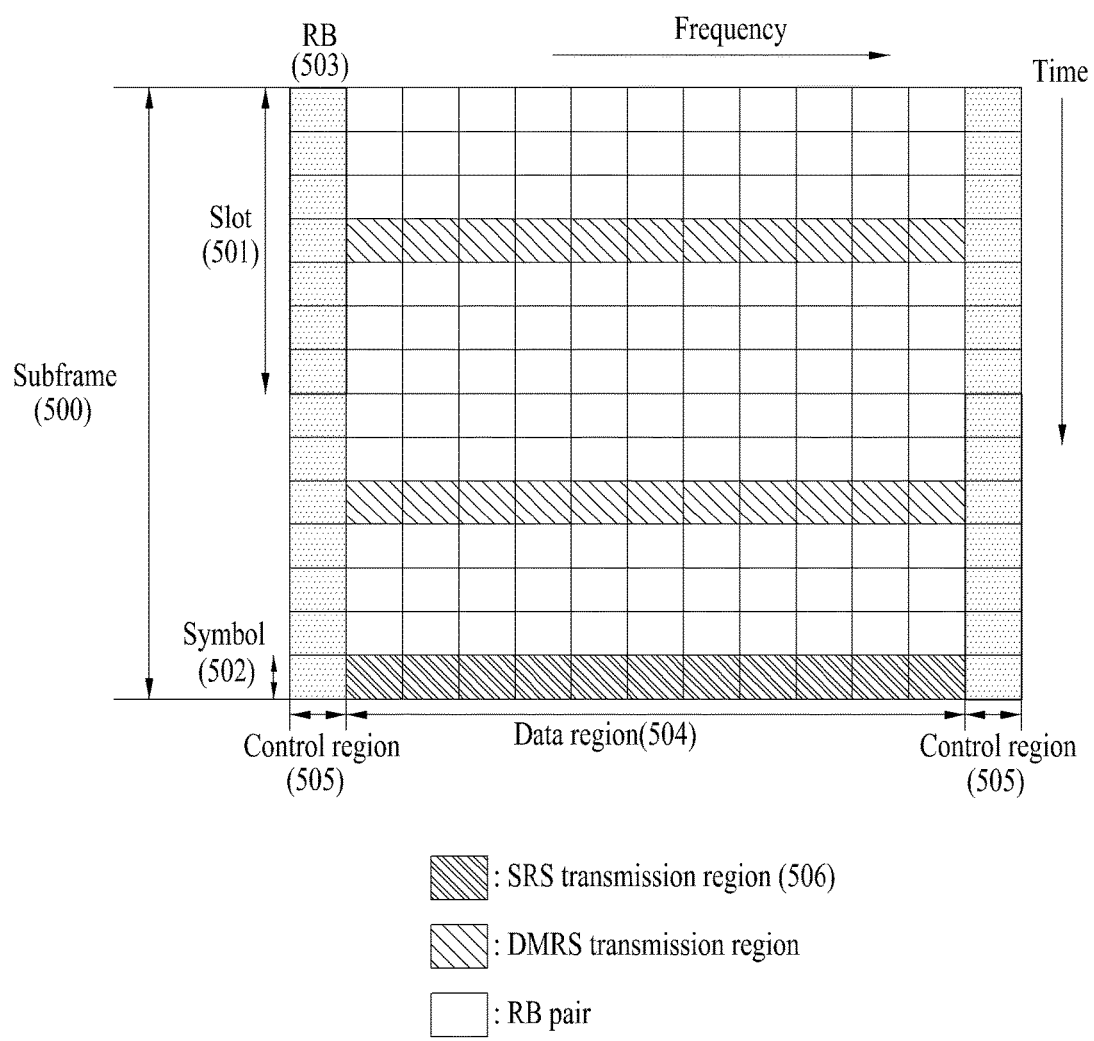
FIG. 5 is a diagram showing the structure of an uplink subframe.

FIG. 5 is a diagram showing the structure of an uplink subframe used in LTE/LTE-A.

Referring to FIG. 5, the uplink subframe includes a plurality (e.g., 2) of slots. The slot may include SC-FDMA symbols, the number of which is changed according to CP length. The uplink subframe may be divided into a control region and a data region in the frequency domain. The data region includes a PUSCH and is used to transmit a data signal such as voice. The control region includes a PUCCH and is used to transmit uplink control information (UCI). The PUCCH includes an RB pair located at both ends of the data region on a frequency axis and is hopped at a slot boundary.

The UCI includes the following control information.

Scheduling request (SR): Information used to request uplink (UL)-SCH resources. This is transmitted using an on-off keying (OOK) method.

HARQ ACK information: Response signal to downlink data packets on a PDSCH. This indicates whether downlink data packets have been successfully received. 1-bit ACK/NACK is transmitted in response to a single downlink codeword (CW) and 2-bit ACK/NACK is transmitted in response to two downlink codewords.

Channel state information (CSI): Feedback information for a downlink channel. This includes channel quality indicator (CQI), rank indicator (RI), precoding matrix indicator (PMI), precoding type indicator (PTI), etc. 20 bits are used per subframe.

Figure 6:
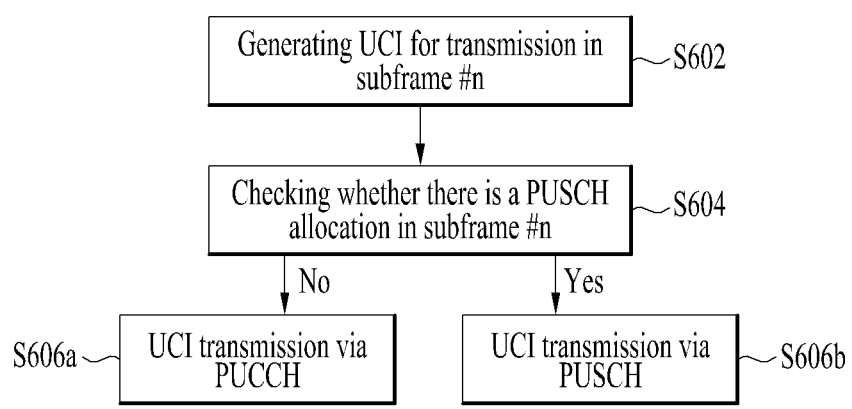
FIG. 6 is a diagram showing channel allocation for uplink control information (UCI) transmission.

FIG. 6 is a diagram showing a channel allocation process for uplink control information (UCI) transmission.

Referring to FIG. 6, a UE generates UCI for transmission in subframe #n (S602). Here, the UCI includes at least one of CQI/PMI, HARQ-ACK and RI. Thereafter, the UE checks whether there is a PUSCH allocation in subframe #n (S604). PUSCH allocation may be performed by semi-persistent scheduling (SPS) or UL grant DCI. If there is no PUSCH allocation in subframe #n, the UCI is transmitted via a PUCCH (S606a) and, when there is a PUSCH allocation, the UCI is transmitted via a PUSCH (S606b). For convenience, transmitting the UCI via the PUSCH is referred to as PUSCH piggybacking. The PUSCH may include UL-SCH data or may not include UL-SCH data if the PUSCH is allocated only for CQI transmission. If the PUSCH is allocated as a part of a random access procedure, the UCI is not transmitted in subframe #n.

Figure 7:
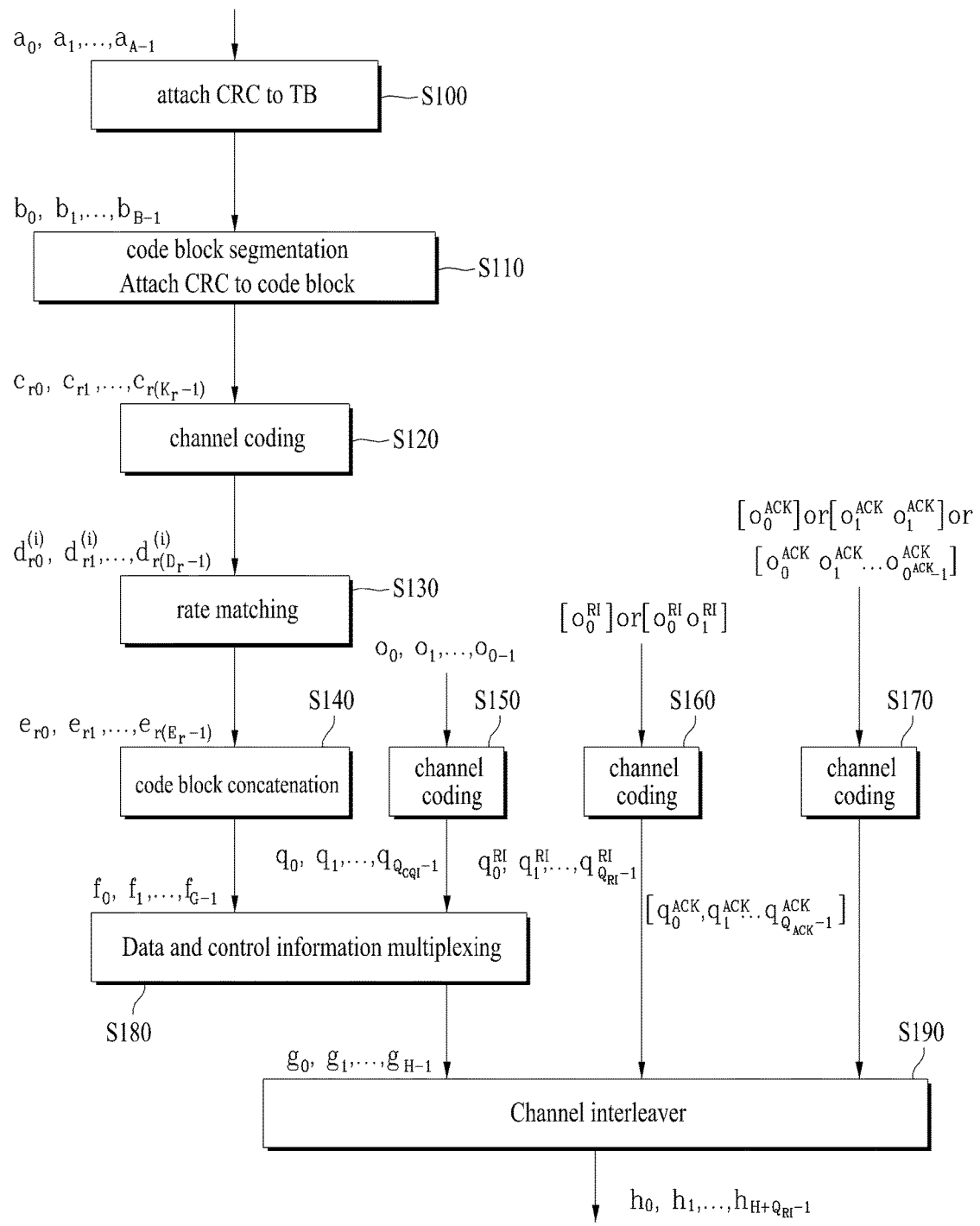
FIG. 7 is a diagram showing a procedure of processing uplink shared channel (UL-SCH) data and control information.

FIG. 7 is a diagram showing a procedure of processing uplink shared channel (UL-SCH) data and control information. For a detailed procedure, refer to 36.212 V8.8.0 (2009. 12) 5.2.2 to 5.2.2.8.

Referring to FIG. 7, error detection is provided to a UL-SCH transport block (TB) via cyclic redundancy check (CRC) attachment (S100).

All transport blocks are used to calculate CRC parity bits. The bits of the transport blocks are $a_0, a_1, a_2, a_3 \ldots, a_{A-1}$. The parity bits are $p_0, p_1, p_2, p_3, \ldots, p_{L-1}$. The size of the transport block is A and the number of parity bits is L.

After transport block CRC attachment, code block segmentation and code block CRC attachment are performed (S110). Bits input for code block segmentation are $b_0, b_1, b_2, b_3, \ldots, b_{B-1}$. B denotes the number of bits of the transport block (including CRC). The bits after code block segmentation are $c_{r0}, c_{r1}, c_{r2}, c_{r3}, \ldots, c_{r(K_r-1)}$. r denotes a code block number (r=0, 1, ..., C−1) and Kr denotes the number of bits of the code block r. C denotes a total number of code blocks.

Channel coding is performed after code block segmentation and code block CRC (S120). Bits after channel coding are $d_{r0}^{(i)}, d_{r1}^{(i)}, d_{r2}^{(i)}, d_{r3}^{(i)} \ldots, d_{r(D_r-1)}^{(i)}$ i=0, 1, 2 and $D_r$ denotes the number of bits of an i-th coded stream for the code block r (that is, $D_r=K_r+4$). r denotes a code block number (r=0, 1, ..., C−1) and Kr denotes the number of bits of the code block r. C denotes a total number of code blocks. For channel coding, turbo coding may be used.

Rate matching is performed after channel coding (S130). The bits after rate matching are $e_{r0}, e_{r1}, e_{r2}, e_{r3}, \ldots, e_{r(E_r-1)}$. $E_r$ denotes the number of rate-matched bits of an r-th code block. r=0, 1, ..., C−1 and C denotes a total number of code blocks.

Code block concatenation is performed after rate matching (S140). The bits after code block concatenation are $f_0, f_1, f_2, f_3, \ldots, f_{G-1}$. G denotes a total number of coded bits for transmission. If control information is multiplexed with UL-SCH transmission, bits used to transmit control information are not included in G. $f_0, f_1, f_2, f_3, \ldots, f_{G-1}$ correspond to a UL-SCH codeword.

In case of UCI, channel coding of channel quality information (CQI and/or PMI) $o_0, o_1, \ldots, o_{O-1}$, RI($[o_0^{RI}]$ or $[o_0^{RI} o_1^{RI}]$) and HARQ-ACT ($[o_0^{ACK}]$, $[o_0^{ACK} o_1^{ACK}]$ or $[o_0^{ACK} o_1^{ACK} \ldots o_{O^{ACK}-1}^{ACK}]$ is independently performed (S150 to S170). Channel coding of UCI is performed based on the number of coded symbols for control information. For example, the number of coded symbols may be used for rate matching of coded control information. The number of coded symbols corresponds to the number of modulation symbols, the number of REs, etc. in a subsequent process.

Channel coding of HARQ-ACK is performed using an input bit sequence $[o_0^{ACK}]$, $[o_0^{ACK} o_1^{ACK}]$ or $[o_0^{ACK} o_1^{ACK} \ldots o_{O^{ACK}-1}^{ACK}]$ of step S170. $[o_0^{ACK}]$ and $[o_0^{ACK} o_1^{ACK}]$ denote 1-bit HARQ-ACK and 2-bit HARQ-ACK, respectively. In addition, $[o_0^{ACK} o_1^{ACK} \ldots o_{O^{ACK}-1}^{ACK}]$ indicates HARQ-ACK composed of information of two or more bits (That is, $O^{ACK}>2$). ACK is coded into 1 and NACK is coded into 0. In case of 1-bit HARQ-ACK, repetition coding is used. In case of 2-bit HARQ-ACK, a (3, 2) simplex code is used and encoded data may be cyclically repeated. In case of HARQ-ACK of 3 or more bits, a (32, 0) block code is used.

Input of a data/control multiplexing block is $f_0, f_1, f_2, f_3, \ldots, f_{G-1}$ meaning coded UL-SCH bits and $q_0, q_1, q_2, q_3, \ldots, q_{Q_{CQI}-1}$ meaning coded CQI/PMI bits (S180). Output of the data/control multiplexing block $g_0, g_1, g_2, g_3, \ldots, g_{H'-1}$. $g_i$ denotes a column vector having a length of $Q_m$ (i=0, ..., =H'−1). H'=H/$Q_m$ and H=(G+$Q_{CQI}$). H denotes a total number of bits allocated for UL-SCH data and CQI/PMI.

Thereafter, at least one of output of the data/control multiplexing block $g_0, g_1, g_2, \ldots, g_{H'-1}$, coded rank indicators $q_0^{RI}, q_1^{RI}, q_2^{RI}, \ldots, q_{Q'_{RI}-1}^{RI}$ and coded HARQ-ACK $q_0^{ACK}, q_1^{ACK}, q_2^{ACK}, \ldots q_{Q'_{ACK}-1}^{ACK}$ is multiplexed by a channel interleaver (S190). $\underline{g}_i$ denotes a column vector having a length of $Q_m$ for CQI/PMI and i=0, ..., H'−1 (H'=H/$Q_m$). $\underline{q}_i^{ACK}$ denotes a column vector having a length of $Q_m$ for ACK/NACK and i=0, ..., Q'$_{ACK}$−1 (Q'$_{ACK}$=Q$_{ACK}$/Q$_m$). $\underline{q}_i^{RI}$ denotes a column vector having a length of $Q_m$ for RI and i=0, ..., Q'$_{RI}$−1 (Q'$_{RI}$=Q$_{RI}$/Q$_m$). The channel interleaver is used to implement time-first mapping of modulation symbols in association with resource mapping for PUSCH.

Although not limited thereto, the output bit sequence of the channel interleaver may be obtained by the process of Table 1.

TABLE 1

(1) Assign $C_{max} = N_{symb}^{PUSCH}$ to be the number of columns of a matrix. The columns of the matrix are numbered 0, 1, 2, ..., $C_{max}$ − 1 from left to right.
$N_{symb}^{PUSCH}$ is the number of SC-FDMA symbols per subframe for PUSCH transmission and given by $N_{symb}^{PUSCH} = (2 \cdot (N_{symb}^{UL} - 1) - N_{SRS})$, where $N_{SRS}$ is equal to 1 if UE is configured to send PUSCH and SRS in the same subframe or if the PUSCH resource allocation is even partially overlaps with cell-specific SRS subframe/bandwidth. Otherwise $N_{SRS}$ is equal to 0. $N_{symb}^{UL}$ is 7 for a normal CP and 6 for an extended CP.
(2) The number of rows of the matrix is $R_{max} = (H'' \cdot Q_m)/C_{max}$ and we define $R'_{max} = R_{max}/Q_m$.
The rows of the rectangular matrix are numbered 0, 1, 2, ..., $R_{max}$ − 1 from top to bottom.
$H'' = H' + Q'_{RI}$.
(3) If rank information is transmitted in this subframe, the vector sequence $\underline{q}_0^{RI}, \underline{q}_1^{RI}, \underline{q}_2^{RI}, ..., \underline{q}_{Q'_{RI}-1}^{RI}$ is
written onto the columns indicated by Table 2, and by sets of Qm rows starting from the last row and moving upwards according to the following pseudocode.
Set i, j to 0.
Set r to $R'_{max}$ − 1
while i < $Q'_{RI}$
   $c_{RI}$ = Column Set( j )
   $\underline{y}_{r \times C_{max} + cRI} = \underline{q}_i^{RI}$
   i = i + 1
   r = $R'_{max}$ − 1 − $\lfloor i/4 \rfloor$
   j = (j + 3) mod 4
end while
Where ColumnSet is given in Table 2 and indexed left to right from 0 to 3.
(4) Write the input vector sequence, for k = 0, 1, ..., H' − 1, into the ($R_{max} \times C_{max}$) matrix by sets of Qm
rows starting with the vector $\underline{y}_0$ in column 0 and rows 0 to ($Q_m$ − 1) and skipping the matrix entries that are already occupied:

$$\begin{bmatrix} \underline{y}_0 & \underline{y}_1 & \underline{y}_2 & \cdots & \underline{y}_{C_{max}-1} \\ \underline{y}_{C_{max}} & \underline{y}_{C_{max}+1} & \underline{y}_{C_{max}+2} & \cdots & \underline{y}_{2C_{max}-1} \\ \vdots & \vdots & \vdots & \ddots & \vdots \\ \underline{y}_{(R'_{max}-1) \times C_{max}} & \underline{y}_{(R'_{max}-1) \times C_{max}+1} & \underline{y}_{(R'_{max}-1) \times C_{max}+2} & \cdots & \underline{y}_{(R'_{max} \times C_{max}-1)} \end{bmatrix}$$

The pseudocode is as follows:
Set i, k to 0.
  While k < H',
    if $\underline{y}_i$ is not assigned to RI symbols
      $\underline{y}_i = \underline{g}_k$
      k = k + 1
    end if
    i = i + 1
  end While
(5) If HARQ-ACK information is transmitted in this subframe, the vector sequence
$\underline{q}_0^{ACK}, \underline{q}_1^{ACK}, \underline{q}_2^{ACK}, ..., \underline{q}_{Q'_{ACK}-1}^{ACK}$ is written onto the columns indicated by Table 3, and by sets of Qm
rows starting from the last row and moving upwards according to the following pseudocode. Note that this operation overwrites some of the channel interleaver entries obtained in step (4).
Set i, j to 0.
Set r to $R'_{max}$ −1
while i < $Q'_{ACK}$
   $c_{ACK}$ = ColumnSet ( j )
   $\underline{y}_{r \times C_{max} + cACK} = \underline{q}_i^{ACK}$
   i = i + 1
   r = $R'_{max}$ − 1 − $\lfloor i/4 \rfloor$
   j = (j + 3) mod 4
end while
Where ColumnSet is given in Table 3 and indexed left to right from 0 to 3.
(6) The output of the block interleaver is the bit sequence read out column by column from the
($R_{max} \times C_{max}$) matrix. The bits after channel interleaving are denoted by $h_0, h_1, h_2, ..., h_{H+Q_{RI}-1}$.

Table 2 shows a column set for insertion of HARQ-ACK information and RI.

TABLE 2

| CP configuration | HARQ-ACK Column Set | RI Column Set |
|---|---|---|
| Normal | {2, 3, 8, 9} | {1, 4, 7, 10} |
| Extended | {1, 2, 6, 7} | {0, 3, 5, 8} |

After channel interleaving, a bit sequence $h_0, h_1, h_2, \ldots, h_{H+Q_{RI}-1}$ read from a channel interleaver matrix row by row is output. The read bit sequence is subjected to scrambling, modulation, discrete Fourier transform (DFT) precoding, power control, etc. and then is mapped on a resource grid. $H''=H'+Q'_{RI}$ modulation symbols are transmitted via a subframe. When the demodulation symbol sequence after DFT precoding is defined as $z(0), \ldots, z(M_{symb}-1), z(0), \ldots, z(M_{symb}-1)$ is multiplied by a power control parameter $\beta_{PUSCH}$ for transmit power control and then is sequentially mapped to physical resource bocks (PRBs) allocated for PUSCH transmission, starting from $z(0)$. $z(i)$ is mapped to RE(k, l) corresponding to a PRB for PUSCH transmission, and is sequentially mapped in ascending order of k and then is sequentially mapped in ascending order of l, starting from the first slot of the subframe. k denotes a subcarrier index and l denotes an SC-FDMA symbol index. An RE for DMRS and an RE reserved for SRS are excluded from mapping. An RE for DMRS is RE(k, l) having l=3 in each slot in normal CP and RE(k, l) having l=6 in each slot in extended CP. The RE reserved for SRS is RE(k, l) having l=6 in a second slot in normal CP and RE(k, l) having l=5 in the second slot in extended CP.

Figure 8:
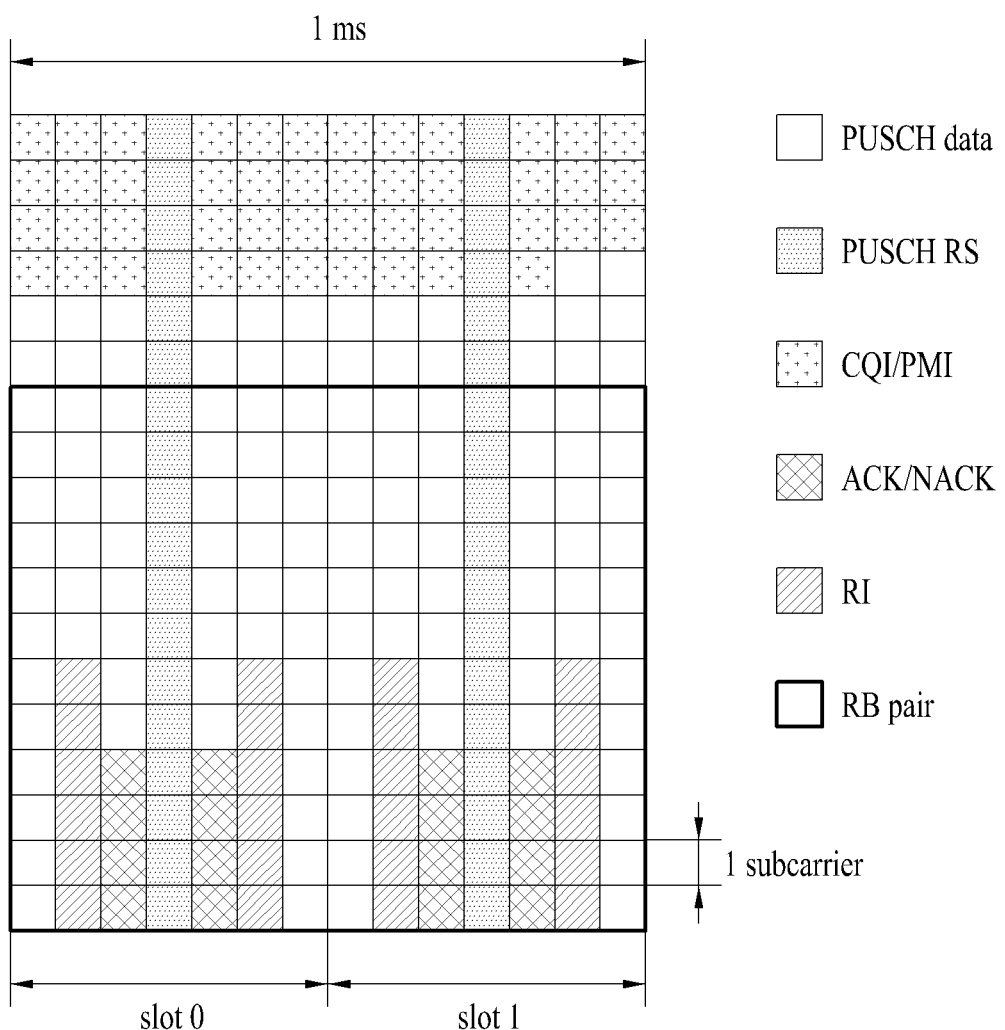
FIG. 8 is a diagram showing multiplexing of control information and UL-SCH data on a physical uplink shared channel (PUSCH).
Figure 9:
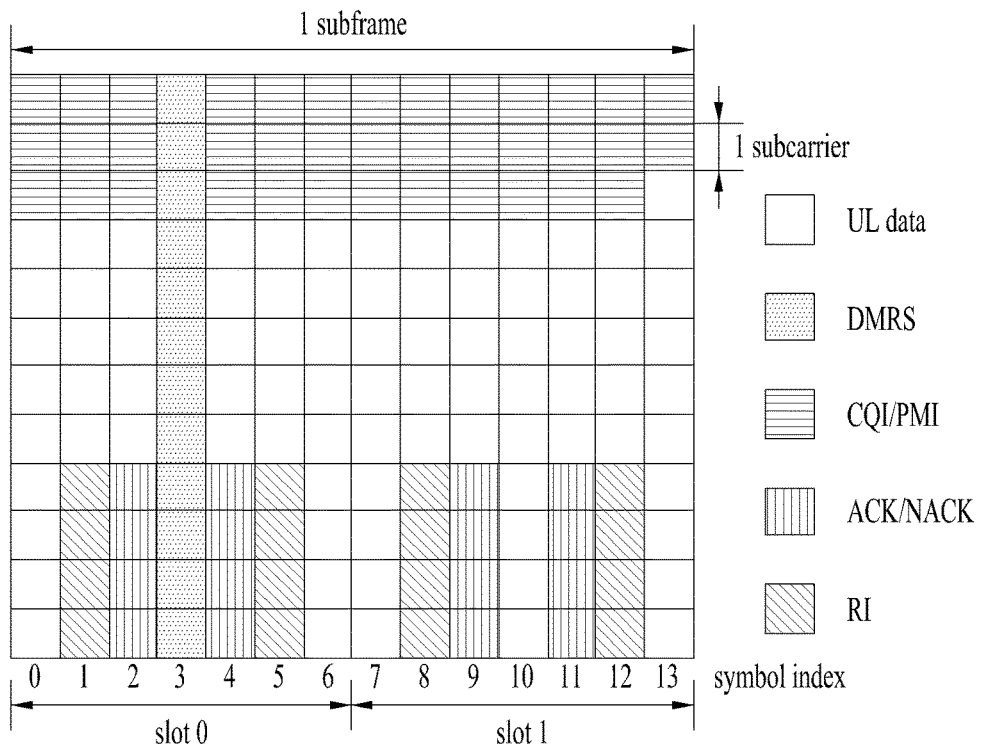
FIGS. 9 to 13 are diagrams showing a method of mapping UCI to a PUSCH according to the present invention.
Figure 10:
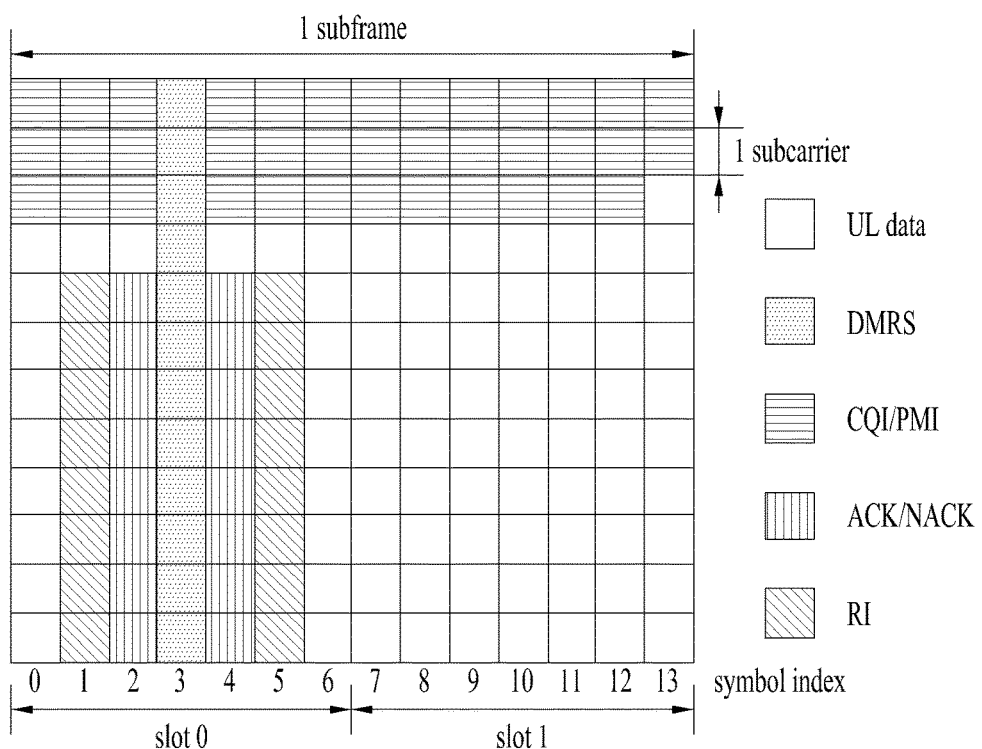
Figure 11:
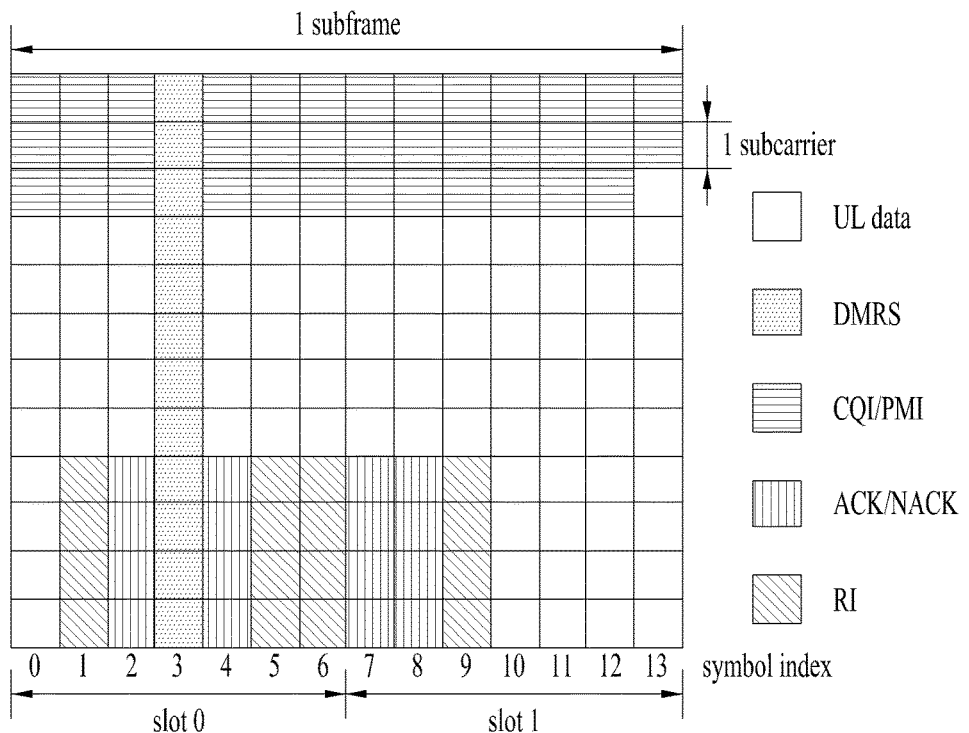
Figure 12:
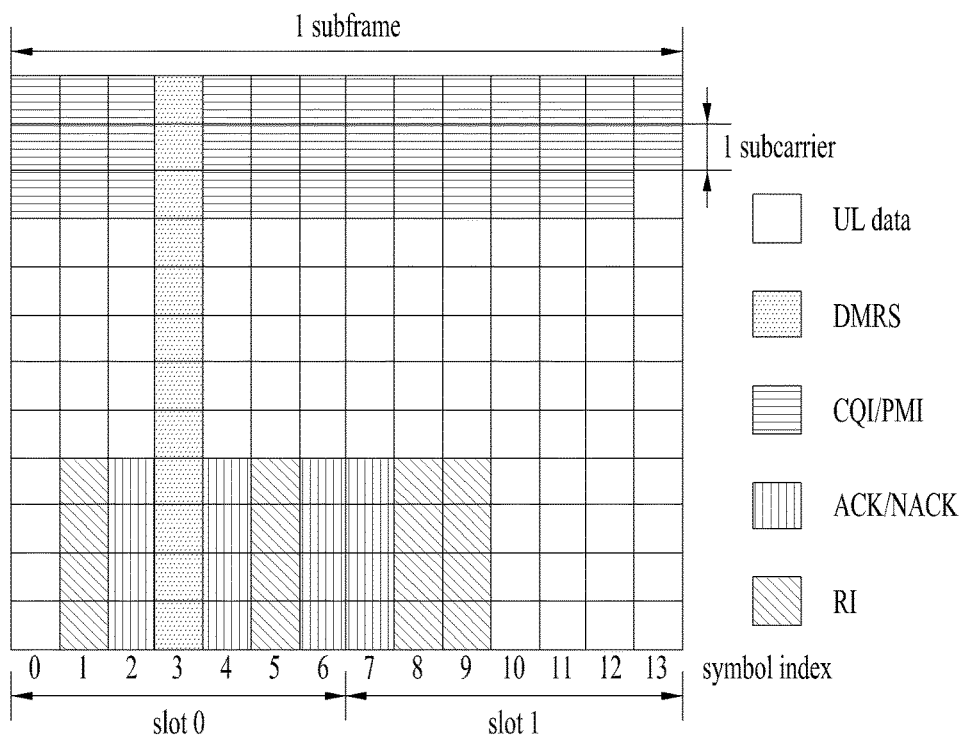

FIG. 8 is a diagram showing multiplexing of control information and UL-SCH data on a physical uplink shared channel (PUSCH). The PUSCH may be transmitted without the UL-SCH. The control information includes at least one of CQI and/or PMI (CQI/PMI), HARQ ACK/NACK and RI. The control information is mapped to two slots of the subframe.

Referring to FIG. 8, CQI/PMI resources are located at a start portion of UL-SCH data resources, are sequentially mapped to all SC-FDMA symbols on one subcarrier and then are mapped to a next subcarrier. CQI/PMI is mapped in a subcarrier from the left to the right, that is, in ascending order of SC-FDMA symbol indices. PUSCH data (UL-SCH data) is subjected to rate matching in consideration of the amount of CQI/PMI resources (that is, the number of coded symbols). The same modulation order as the UL-SCH data is used for CQI/PMI. ACK/NACK is inserted into some of SC-FDMA resources, to which UL-SCH data is mapped, via puncturing. ACK/NACK is located beside an RS and is filled in SC-FDMA symbols from bottom to top, that is, in ascending order of subcarrier indices. In the subframe, regardless of ACK/NACK transmission, the RI is located beside the SC-FDMA symbol for ACK/NACK. More specifically, in normal CP, the DMRS may be mapped to SC-FDMA symbol #3/#10, ACK/NACK may be mapped to SC-FDMA symbol #2/4/9/11 and the RI may be mapped to SC-FDMA symbol #1/5/8/12. In extended CP, the DMRS may be mapped to SC-FDMA symbol #2/#8, ACK/NACK may be mapped to SC-FDMA symbol #1/3/7/9 and the RI may be mapped to SC-FDMA symbol #0/4/6/10. The SC-FDMA symbol index is $0, 1, \ldots, N_{sub}-1$ and $N_{sub}$ denotes the number of SC-FDMA symbols located in a subframe. $N_{sub}$ is 14 in normal CP and 12 in extended CP.

The DMRS sequence is distinguished by a cyclic shift (CS) value and the CS value is indicated by a DMRS CS field in UL grant (e.g., DCI format 0/4) corresponding to PUSCH transmission. DCI format 0 includes scheduling information for single antenna port transmission and DCI format 4 includes scheduling information for multiple antenna port transmission (e.g., spatial multiplexing). If DCI format 4 is used, the value of the DMRS CS field in DCI format is mapped to CS parameter and orthogonal cover code (OCC) as shown in Table 3. If DCI format 0 is used, the value of the DMRS CS field is fixed to OCC=[1 1].

TABLE 3

| CS Field in uplink-related DCI format | $n_{DMRS,\lambda}^{(2)}$ | | | | $[w^{(\lambda)}_{(0)} \, w^{(\lambda)}_{(1)}]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0 | 6 | 3 | 9 | [1 1] | [1 1] | [1 −1] | [1 −1] |
| 001 | 6 | 0 | 9 | 3 | [1 −1] | [1 −1] | [1 1] | [1 1] |
| 010 | 3 | 9 | 6 | 0 | [1 −1] | [1 −1] | [1 1] | [1 1] |
| 011 | 4 | 10 | 7 | 1 | [1 1] | [1 1] | [1 1] | [1 1] |
| 100 | 2 | 8 | 5 | 11 | [1 1] | [1 1] | [1 1] | [1 1] |
| 101 | 8 | 2 | 11 | 5 | [1 −1] | [1 −1] | [1 −1] | [1 −1] |
| 110 | 10 | 4 | 1 | 7 | [1 −1] | [1 −1] | [1 −1] | [1 −1] |
| 111 | 9 | 3 | 0 | 6 | [1 1] | [1 1] | [1 −1] | [1 −1] | where, $n_{DMRS,\lambda}^{(2)}$ denotes a CS parameter used to determine the CS value of the DMRS. $\lambda$ denotes a layer index. A first value of OCC is multiplied by the DMRS of a first slot and a second value of OCC is multiplied by the DMRS of a second slot.

Embodiment

UCI Piggybacking According to DMRS Symbol

As shown in FIG. 8, in a legacy LTE (3GPP Rel-8/9) and LTE-A (3GPP Rel-10/11) system, a PUSCH which is a UL data channel has a structure in which one DMRS symbol is transmitted per slot, that is, two DMRS symbols are transmitted per RB, in one RB pair. In a future system, a method of controlling (e.g., reducing or increasing) the number of DMRS symbols according to UE situation may be considered for the purpose of enhancing spectral efficiency and improving cell coverage. In this case, unlike a conventional method, when UCI is piggybacked on a PUSCH having a different number of DMRS symbols, SC-FDMA symbol to which each UCI (e.g., A/N, RI) is mapped needs to be determined. Hereinafter, a UCI mapping method for piggybacking UCI on a PUSCH when the number of DMRS symbols is changed is proposed. More specifically, the case in which the number of DMRS symbols per RB is 1 (slot-based reduced DMRS), that is, the case in which one DMRS symbol is transmitted via one specific slot in one RB pair, will be described with reference to FIGS. 9 to 12.

Case 1: Normal CP, DMRS on SC-FDMA Symbol #3 (that is, First Slot)

Alt 1-1: A/N on SC-FDMA symbol #2/4/9/11, RI on SC-FDMA symbol #1/5/8/12. According to the present method, since a conventional UCI symbol location may be maintained (see FIG. 8), additional UE complexity according to DMRS variance may be avoided (see FIG. 9).

Alt 1-2: A/N on SC-FDMA symbol #2/4 only, RI on SC-FDMA symbol #1/5 only. According to the present method, similarly to a conventional method, since A/N and RI are mapped to only SC-FDMA symbols closest to DMRSs, it is possible to prevent UCI performance deterioration according to DMRS variance (see FIG. 10).

Alt 1-3: A/N on SC-FDMA symbol #2/4/7/8, RI on SC-FDMA symbol #1/5/6/9. According to the present method, since a conventional UCI mapping symbol order is maintained and UCI is rearranged to be closer to DMRSs, it is possible to prevent UCI performance deterioration (see FIG. 11).

Alt 1-4: A/N on SC-FDMA symbol #2/4/6/7 (or #0/2/4/6), RI on SC-FDMA symbol #1/5/8/9 (or #1/5/7/8). According to the present method, since conventional UCI mapping in a first slot is maintained and A/N is mapped to be closer to DMRS rather than RI in the remaining slot, it is possible to prevent A/N performance deterioration (see FIG. 12).

Figure 13:
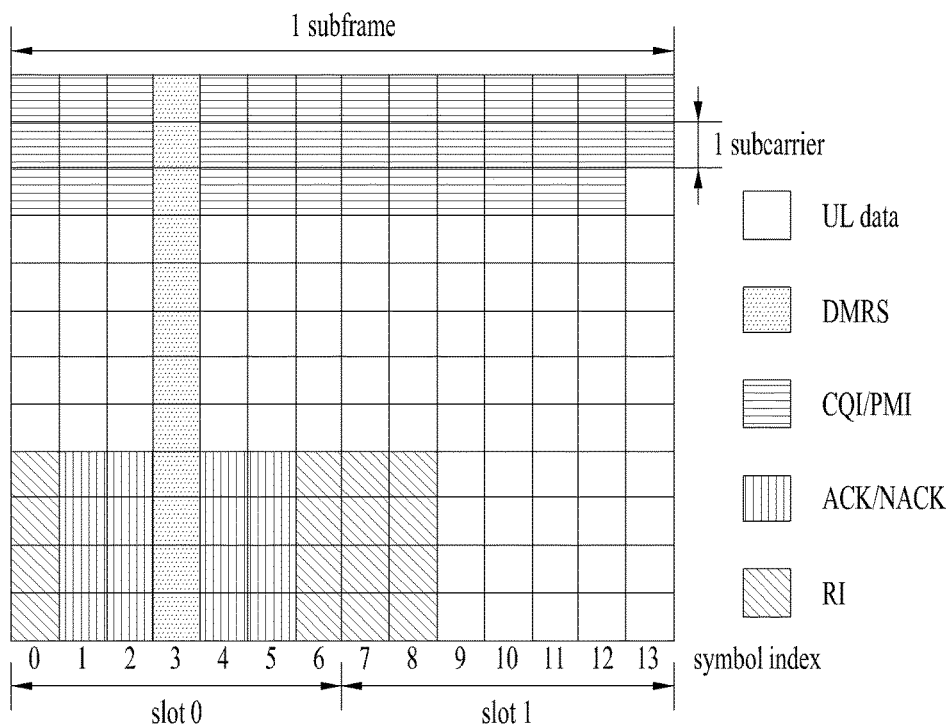

Alt 1-5: A/N on SC-FDMA symbol #1/2/4/5, RI on SC-FDMA symbol #0/6/7/8 (or #6/7/8/9). According to the present method, since A/N is first mapped to SC-FDMA symbols closest to DMRSs and RI is mapped to symbols close to DMRSs except for the closest SC-FDMA symbols, it is possible to prevent A/N performance deterioration (see FIG. 13).

Alt 1-1 to 1-5 may be implemented using a conventional interleaving process. For example, Alt 1-1 to 1-5 may be implemented by replacing $N_{symb}^{PUSCH}$ with $N_{symb}^{PUSCH}=(2 \cdot N_{symb}^{UL}-1-N_{SRS})$ in Table 1 and modifying Table 2 as follows.

TABLE 4

|  | HARQ-ACK Column Set | RI Column Set |
|---|---|---|
| Alt 1-1 | {2, 3, 8, 10} | {1, 4, 7, 11} |
| Alt 1-2 | {2, 3} | {1, 4} |
| Alt 1-3 | {2, 3, 6, 7} | {1, 4, 5, 8} |
| Alt 1-4 | {2, 3, 5, 6} | {1, 4, 7, 8} |
|  | {0, 2, 3, 5} | {1, 4, 6, 7} |
| Alt 1-5 | {1, 2, 3, 4} | {0, 5, 6, 7} |
|  | {1, 2, 3, 4} | {5, 6, 7, 8} |

Case 2: Extended CP, DMRS on SC-FDMA Symbol #2 (that is, First Slot)

A UCI mapping method for the extended CP case when applying a principle equal/similar to the normal CP will now be described.

Alt 2-1: A/N on SC-FDMA symbol #1/3/7/9, RI on SC-FDMA symbol #0/4/6/10

Alt 2-2: A/N on SC-FDMA symbol #1/3 only, RI on SC-FDMA symbol #0/4 only

Alt 2-3: A/N on SC-FDMA symbol #1/3/6/7, RI on SC-FDMA symbol #0/4/5/8

Alt 2-4: A/N on SC-FDMA symbol #1/3/5/6, RI on SC-FDMA symbol #0/4/7/8

Alt 2-5: A/N on SC-FDMA symbol #0/1/3/4, RI on SC-FDMA symbol #5/6/7/8

Alt 2-1 to 2-5 may be implemented by replacing $N_{symb}^{PUSCH}$ with $N_{symb}^{PUSCH}=(2 \cdot N_{symb}^{UL}-1-N_{SRS})$ in Table 1 and modifying Table 2 as follows.

TABLE 5

|  | HARQ-ACK Column Set | RI Column Set |
|---|---|---|
| Alt 2-1 | {1, 2, 6, 8} | {0, 3, 5, 9} |
| Alt 2-2 | {1, 2} | {0, 3} |
| Alt 2-3 | {1, 2, 5, 6} | {0, 3, 4, 7} |
| Alt 2-4 | {1, 2, 4, 5} | {0, 3, 6, 7} |
| Alt 2-5 | {0, 1, 2, 3} | {4, 5, 6, 7} |

Case 3: Normal CP, DMRS on SC-FDMA Symbol #10 (that is, Second Slot)

A UCI mapping method when a principle equal/similar to the above-described first slot DMRS case is fundamentally applied and rate-matching is applied for SRS transmission/protection such that a last SC-FDMA symbol (that is, SC-FDMA symbol #13) is not available will now be described.

Alt 3-1: A/N on SC-FDMA symbol #2/4/9/11, RI on SC-FDMA symbol #1/5/8/12

Alt 3-2: A/N on SC-FDMA symbol #9/11 only, RI on SC-FDMA symbol #8/12 only

Alt 3-3: A/N on SC-FDMA symbol #5/6/9/11, RI on SC-FDMA symbol #4/7/8/12

Alt 3-4: A/N on SC-FDMA symbol #6/7/9/11, RI on SC-FDMA symbol #4/5/8/12

Alt 3-5: A/N on SC-FDMA symbol #8/9/11/12, RI on SC-FDMA symbol#4/5/6/7

Alt 3-1 to 3-5 may be implemented by replacing $N_{symb}^{PUSCH}$ with $N_{symb}^{PUSCH}=(2 \cdot N_{symb}^{UL}-1-N_{SRS})$ in Table 1 and modifying Table 2 as follows.

TABLE 6

|  | HARQ-ACK Column Set | RI Column Set |
|---|---|---|
| Alt 3-1 | {2, 4, 9, 10} | {1, 5, 8, 11} |
| Alt 3-2 | {9, 10} | {8, 11} |
| Alt 3-3 | {5, 6, 9, 10} | {4, 7, 8, 11} |
| Alt 3-4 | {6, 7, 9, 10} | {4, 5, 8, 11} |
| Alt 3-5 | {8, 9, 10, 11} | {4, 5, 6, 7} |

Case 4: Extended CP, DMRS on SC-FDMA Symbol #8 (that is, Second Slot)

A UCI mapping method when a principle equal/similar to the above-described first slot DMRS case is fundamentally applied and rate-matching is applied for SRS transmission/protection such that a last SC-FDMA symbol (that is, SC-FDMA symbol #11) is not available will now be described.

Alt 4-1: A/N on SC-FDMA symbol #1/3/7/9, RI on SC-FDMA symbol #0/4/6/10

Alt 4-2: A/N on SC-FDMA symbol #7/9 only, RI on SC-FDMA symbol #6/10 only

Alt 4-3: A/N on SC-FDMA symbol #3/4/7/9, RI on SC-FDMA symbol #2/5/6/10

Alt 4-4: A/N on SC-FDMA symbol #4/5/7/9, RI on SC-FDMA symbol #2/3/6/10

Alt 4-5: A/N on SC-FDMA symbol #6/7/9/10, RI on SC-FDMA symbol #2/3/4/5

Alt 4-1 to 4-5 may be implemented by replacing $N_{symb}^{PUSCH}$ with $N_{symb}^{PUSCH}=(2 \cdot N_{symb}^{UL}-1-N_{SRS})$ in Table 1 and modifying Table 2 as follows.

TABLE 7

|  | HARQ-ACK Column Set | RI Column Set |
| --- | --- | --- |
| Alt 2-1 | {1, 3, 7, 8} | {0, 4, 6, 9} |
| Alt 2-2 | {7, 8} | {6, 9} |
| Alt 2-3 | {3, 4, 7, 8} | {2, 5, 6, 9} |
| Alt 2-4 | {4, 5, 7, 8} | {2, 3, 6, 9} |
| Alt 2-5 | {6, 7, 8, 9} | {2, 3, 4, 5} |

If a conventional method of sequentially mapping CQI/PMI to all SC-FDMA symbols in a subframe using a time-first method starting from a first subcarrier in PRB(s) allocated to for PUSCH transmission is applied without change, performance deterioration may occur in a slot, in which the DMRS is not transmitted. Accordingly, in a state of applying a slot-based reduced DMRS, preferentially mapping CQI/PMI to SC-FDMA symbols in a slot, in which the DMRS is transmitted, over all RBs (sequentially starting from a first subcarrier) and then mapping CQI/PMI to SC-FDMA symbols in a slot, in which the DMRS is not transmitted, is proposed. Similarly, in a state of applying slot-based reduced DMRS, preferentially mapping A/N and RI to UCI (A/N or RI) symbols closest to DMRSs over all RBs (sequentially starting from a last subcarrier) and then mapping A/N and RI to the remaining UCI symbols is proposed. For example, in case 1 (that is, normal CP, DMRS on SC-FDMA symbol #3 (that is, first slot)), the following UCI mapping method is applicable. The same method is applicable to cases 2 to 4.

Alt 1-1: A/N on SC-FDMA symbol #2/4/9/11, RI on SC-FDMA symbol #1/5/8/12. A/N may be preferentially mapped to SC-FDMA symbol #2/4 over all RBs and then mapped to SC-FDMA symbol #9/11. RI may be preferentially mapped to SC-FDMA symbol #1/5 over all RBs and then mapped to SC-FDMA symbol #8/12.

Alt 1-2: A/N on SC-FDMA symbol #2/4 only, RI on SC-FDMA symbol #1/5 only. Not applicable.

Alt 1-3: A/N on SC-FDMA symbol #2/4/7/8, RI on SC-FDMA symbol #1/5/6/9. A/N may be preferentially mapped to SC-FDMA symbol #2/4 over all RBs and then mapped to SC-FDMA symbol #7/8. RI may be preferentially mapped to SC-FDMA symbol #1/5 over all RBs and then mapped to SC-FDMA symbol #6/9.

Alt 1-4: A/N on SC-FDMA symbol #2/4/6/7 (or #0/2/4/6), RI on SC-FDMA symbol #1/5/8/9 (or #1/5/7/8). A/N may be preferentially mapped to SC-FDMA symbol #2/4 over all RBs and then mapped to SC-FDMA symbol #6/7 (or #0/6). RI may be preferentially mapped to SC-FDMA symbol #1/5 over all RBs and then mapped to SC-FDMA symbol #8/9 (or #7/8).

Alt 1-5: A/N on SC-FDMA symbol #1/2/4/5, RI on SC-FDMA symbol #0/6/7/8 (or #6/7/8/9). A/N may be preferentially mapped to SC-FDMA symbol #2/4 over all RBs and then mapped to SC-FDMA symbol #0/6 (or #6/7). RI may be preferentially mapped to SC-FDMA symbol #0/6 (or #6/7) over all RBs and then mapped to SC-FDMA symbol #7/8 (or #8/9).

Similarly, transmission of three or more DMRS symbols in one RB pair (or two or more DMRS symbols in at least one slot) may be considered (hereinafter, slot-based increased DMRS). In this case, CQI/PMI may be preferentially mapped to SC-FDMA symbols in a slot, in which a larger number of DMRS symbols is transmitted, (sequentially starting from a first subcarrier) over all RBs and then mapped to SC-FDMA symbols in a slot, in which a smaller number of DMRS symbols is transmitted. In addition, A/N and RI may be preferentially mapped to UCI (A/N or RI) symbols in a slot, in which a larger number of DMRS symbols is transmitted, (sequentially starting from a last subcarrier) over all RBs and then mapped to the remaining UCI symbols in a slot, in which a smaller number of DMRS symbols is transmitted.

Meanwhile, when slot-based reduced DMRS is applied, for legacy (Rel-10) DMRS symbols in a slot, in which DMRS symbols are transmitted, (i) data (and/or UCI) is defined/set to be mapped/transmitted in order to increase multiplexing of a plurality of UEs or (ii) data (and/or UCI) may be defined/set to be not mapped/transmitted in order to mitigate inter-UE/cell interference. In addition, regardless of data mapping allowance, UCI may be always defined/set to be not mapped/transmitted to/on legacy (Rel-10) DMRS symbols in a slot in which DMRS symbols are not transmitted or, (regardless of data mapping allowance), if UCI is piggybacked, UCI (and/or data) may be defined/set to be not mapped/transmitted to/on SC-FDMA symbols.

When slot-based reduced DMRS is applied, one of the following may be semi-statically configured via radio resource control (RRC)/medium access control (MAC) signaling or may be dynamically configured via UL grant.

which of slot-based reduced DMRS and legacy DMRS is applied via which of an even/odd slot the DMRS is transmitted When the DMRS structure is indicated via UL grant, a new field may be added to UL grant (e.g., DCI format 0/4) to indicate the above information or an existing field in UL grant may be borrowed to indicate the above information. In addition, the above information may be implicitly estimated via value(s) signaled via existing specific field(s) in UL grant (e.g., DMRS CS field) or a combination thereof (for convenience, such signaling is referred to as a DMRS indicator).

Meanwhile, even when reduced DMRS (and/or increased DMRS) is configured, the legacy DMRS structure may be maintained/used in consideration of RRC reconfiguration, backward compatibility, control overhead, performance loss, etc. In this case, UCI may be mapped according to a conventional method (e.g., FIG. 8).

1) PUSCH scheduled by a PDCCH (UL grant) transmitted from a common search space (CSS).

2) PUSCH scheduled based on semi-persistent scheduling (SPS)

3) PUSCH scheduled via random access response (RAR)

4) retransmitted PUSCH 5) rate-matched PUSCH for SRS transmission/protection

Although second slot based reduced DMRS is configured to be applied to the rate-matched PUSCH, first slot-based reduced DMRS may be applied to the rate-matched PUSCH (in consideration of channel estimation performance and/or UCI piggybacking). In the other case, the second slot based reduced DMRS is applicable according to configuration.

Figure 14:
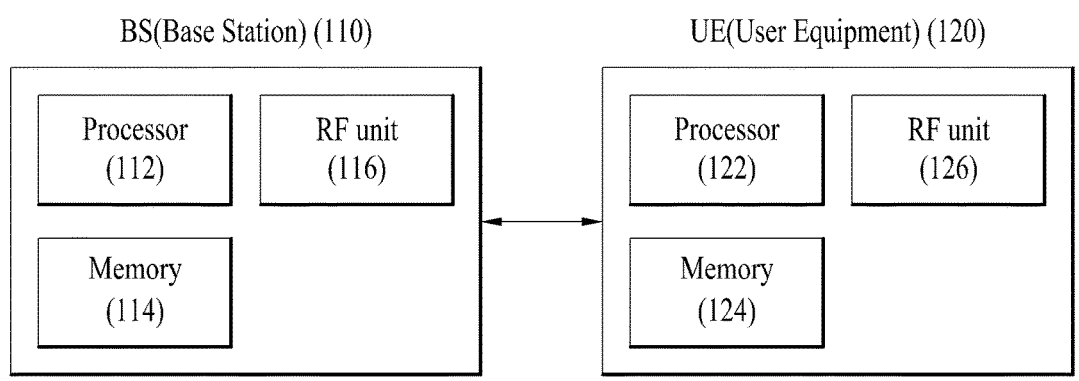
FIG. 14 is a diagram showing a base station (BS) and a user equipment (UE) to which the present invention is applicable.

FIG. 14 is a diagram showing a base station (BS) and a user equipment (UE) to which the present invention is applicable. In a system including a relay, the BS or UE may be replaced with the relay.

Referring to FIG. 14, a wireless communication system includes a BS 110 and a UE 120. The BS 110 includes a processor 112, a memory 114, and a Radio Frequency (RF) unit 116. The processor 112 may be configured so as to implement the procedures and/or methods proposed in the present invention. The memory 114 is connected to the processor 112 and stores various pieces of information related to operations of the processor 112. The RF unit 116 is connected to the processor 112 and transmits and/or receives RF signals. The UE 120 includes a processor 122, a memory 124, and an RF unit 126. The processor 122 may be configured so as to implement the procedures and/or methods proposed in the present invention. The memory 124 is connected to the processor 122 and stores various pieces of information related to operations of the processor 122. The RF unit 126 is connected to the processor 122 and transmits and/or receives RF signals. The BS 110 and/or the UE 120 may have a single antenna or multiple antennas.

The embodiments of the present invention described hereinabove are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It will be apparent that some claims referring to specific claims may be combined with another claims referring to the other claims other than the specific claims to constitute an embodiment or add new claims by means of amendment after the application is filed.

In this document, the embodiments of the present invention have been described centering on a data transmission and reception relationship between a UE and a BS. In some cases, a specific operation described as performed by the BS may be performed by an upper node of the BS. Namely, it is apparent that, in a network comprised of a plurality of network nodes including a BS, various operations performed for communication with a UE may be performed by the BS, or network nodes other than the BS. The term BS may be replaced with the terms fixed station, Node B, eNode B (eNB), access point, etc. The term terminal may be replaced with the terms user equipment (UE), mobile station (MS), mobile subscriber station (MSS), etc.

The embodiments of the present invention may be achieved by various means, for example, hardware, firmware, software, or a combination thereof. In a hardware configuration, the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a wireless communication device such as a UE, a relay, a BS, etc.

What is claimed is:

1. A method of transmitting an uplink signal at a user equipment (UE) in a wireless communication system, the method comprising:
generating rank information (RI) and hybrid automatic repeat request acknowledgement (HARQ-ACK) information;
transmitting the uplink signal via a plurality of single carrier frequency division multiple access (SC-FDMA) symbols in a subframe,
wherein the uplink signal includes the RI and the HARQ-ACK information,
wherein the plurality of SC-FDMA symbols includes SC-FDMA symbol #n for a reference signal (RS), a first set of SC-FDMA symbols for the RI and a second set of SC-FDMA symbols for the HARQ-ACK and n denotes an integer of 0 or more, and
wherein the first set of SC-FDMA symbols includes SC-FDMA symbols #n−2, #n+2, #n+5 and #n+6 and the second set of SC-FDMA symbols includes SC-FDMA symbols #n−1, #n+1, #n+3 and #n+4.

2. The method according to claim 1, wherein, when a normal cyclic prefix (CP) is configured, the subframe includes 14 SC-FDMA symbols and SC-FDMA symbol #n is SC-FDMA symbol #3.

3. The method according to claim 1, wherein, when an extended cyclic prefix (CP) is configured, the subframe includes 12 SC-FDMA symbols and SC-FDMA symbol #n is SC-FDMA symbol #2.

4. The method according to claim 1, wherein the RI is mapped to SC-FDMA symbols #n−2 and #n+2 and then is mapped to SC-FDMA symbols #n+5 and #n+6.

5. The method according to claim 1, wherein the HARQ-ACK is mapped to SC-FDMA symbols #n−1 and #n+1 and then is mapped to SC-FDMA symbols #n+3 and #n+4.

6. The method according to claim 1, wherein the uplink signal includes a physical uplink shared channel (PUSCH) signal.

7. A user equipment (UE) configured to transmit an uplink signal in a wireless communication system, the UE comprising:
a radio frequency (RF) unit; and
a processor,
wherein the processor is configured to generate rank information (RI) and hybrid automatic repeat request acknowledgement (HARQ-ACK) information and transmit the uplink signal via a plurality of single carrier frequency division multiple access (SC-FDMA) symbols in a subframe,
wherein the uplink signal includes the RI and the HARQ-ACK information,
wherein the plurality of SC-FDMA symbols includes SC-FDMA symbol #n for a reference signal (RS), a first set of SC-FDMA symbols for the RI and a second set of SC-FDMA symbols for the HARQ-ACK and n denotes an integer of 0 or more, and wherein the first set of SC-FDMA symbols includes SC-FDMA symbols #n−2, #n+2, #n+5 and #n+6 and the second set of SC-FDMA symbols includes SC-FDMA symbols #n−1, #n+1, #n+3 and #n+4.

8. The UE according to claim 7, wherein, when a normal cyclic prefix (CP) is configured, the subframe includes 14 SC-FDMA symbols and SC-FDMA symbol #n is SC-FDMA symbol #3.

9. The UE according to claim 7, wherein, when an extended cyclic prefix (CP) is configured, the subframe includes 12 SC-FDMA symbols and SC-FDMA symbol #n is SC-FDMA symbol #2.

10. The UE according to claim 7, wherein the RI is mapped to SC-FDMA symbols #n−2 and #n+2 and then is mapped to SC-FDMA symbols #n+5 and #n+6.

11. The UE according to claim 7, wherein the HARQ-ACK is mapped to SC-FDMA symbols #n−1 and #n+1 and then is mapped to SC-FDMA symbols #n+3 and #n+4.

12. The UE according to claim 7, wherein the uplink signal includes a physical uplink shared channel (PUSCH) signal.

* * * * *